US012717150B2

(12) United States Patent
Allen et al.

(10) Patent No.: US 12,717,150 B2

(45) Date of Patent: Aug. 25, 2026

(54) EXTENDED REALITY (XR) SYSTEM WITH BODY-CENTRIC POSE ESTIMATION USING ALTIMETER RELATIVE ELEVATION

(71) Applicant: Magic Leap, Inc., Plantation, FL (US)

(72) Inventors: Cuthbert Martindale Allen, Miramar, FL (US); Fredy Fernando Munoz Mopan, Plantation, FL (US); Jose Felix Rodriguez, Hialeah, FL (US); Koon Keong Shee, Miramar, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/873,288

(22) PCT Filed: Jun. 9, 2023

(86) PCT No.: PCT/US2023/068258

§ 371 (c)(1),
(2) Date: Dec. 9, 2024

(87) PCT Pub. No.: WO2023/240279

PCT Pub. Date: Dec. 14, 2023

(65) Prior Publication Data

US 2025/0355260 A1 Nov. 20, 2025

Related U.S. Application Data

(60) Provisional application No. 63/366,191, filed on Jun. 10, 2022.

(51) Int. Cl.

*G02B 27/01* (2006.01)
*G01C 5/06* (2006.01)
*G06F 3/01* (2006.01)

(52) U.S. Cl.

CPC .......... *G02B 27/0176* (2013.01); *G01C 5/06* (2013.01); *G06F 3/012* (2013.01)

(58) Field of Classification Search

None

See application file for complete search history.

(56) References Cited

U.S. PATENT DOCUMENTS

2016/0306351 A1 10/2016 Fisher et al.
2019/0179426 A1 6/2019 Ojala (Continued)

OTHER PUBLICATIONS

PCT International Search Report for International Appln. No. PCT/US23/68258, Applicant Magic Leap, Inc., dated Nov. 6, 2024.

(Continued)

*Primary Examiner* — Ke Xiao

(74) *Attorney, Agent, or Firm* — Vista IP Law Group, LLP

(57) ABSTRACT

An extended reality (XR) system, comprises a head-mounted display (HMD) configured for displaying virtual content to a user, a first altimeter carried by the HMD, a hand-held control, and a second altimeter carried by the hand-held control. The first altimeter configured for outputting first atmospheric pressure data indicative of an elevation of the HMD, while the second altimeter is configured for outputting second atmospheric pressure data indicative of an elevation of the hand-held control. The XR system further comprises at least one processor configured for determining a relative elevation between the first altimeter and the second altimeter based on the first atmospheric pressure data and the second atmospheric pressure data.

19 Claims, 13 Drawing Sheets

(56) References Cited

U.S. PATENT DOCUMENTS

| | | | |
|---|---|---|---|
| 2020/0183488 | A1 | 6/2020 | Hong et al. |
| 2020/0258948 | A1 | 8/2020 | Seo et al. |
| 2022/0206566 | A1 * | 6/2022 | Senkal ...................... G06T 7/70 |

OTHER PUBLICATIONS

PCT Written Opinion for International Appln. No. PCT/US23/68258, Applicant Magic Leap, Inc., dated Nov. 6, 2024.

PCT International Preliminary Report on Patentability for Appln. No. PCT/US23/68258, Applicant Magic Leap, Inc., dated Nov. 6, 2024.

Manivannan et al., “On the Challenges and Potential of Using Barometric Sensors to Track Human Activity,” Sensors 2020, dated Nov. 27, 2020.

Extended European Search Report for EP Patent Appln. No. 23820710.4 dated May 18, 2026.

* cited by examiner

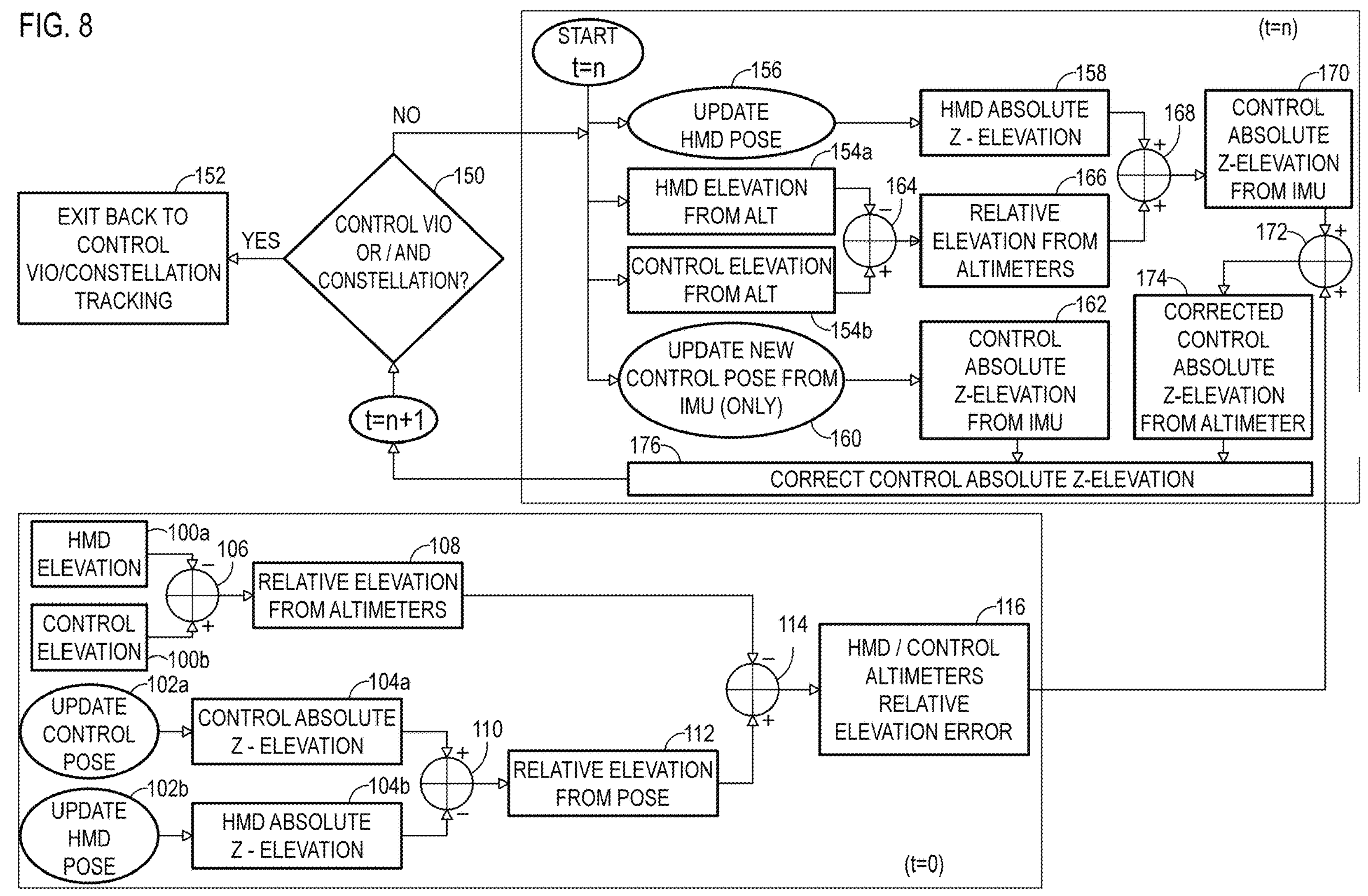
FIG. 8
(t=n)
START t=n
UPDATE HMD POSE
156
HMD ABSOLUTE Z - ELEVATION
158
168
CONTROL ABSOLUTE Z-ELEVATION FROM IMU
170
NO
EXIT BACK TO CONTROL VIO/CONSTELLATION TRACKING
152
YES
CONTROL VIO OR / AND CONSTELLATION?
150
HMD ELEVATION FROM ALT
154a
164
RELATIVE ELEVATION FROM ALTIMETERS
166
172
CONTROL ELEVATION FROM ALT
154b
174
CORRECTED CONTROL ABSOLUTE Z-ELEVATION FROM ALTIMETER
UPDATE NEW CONTROL POSE FROM IMU (ONLY)
160
CONTROL ABSOLUTE Z-ELEVATION FROM IMU
162
t=n+1
176
CORRECT CONTROL ABSOLUTE Z-ELEVATION
HMD ELEVATION
100a
106
RELATIVE ELEVATION FROM ALTIMETERS
108
CONTROL ELEVATION
100b
114
HMD / CONTROL ALTIMETERS RELATIVE ELEVATION ERROR
116
UPDATE CONTROL POSE
102a
CONTROL ABSOLUTE Z - ELEVATION
104a
110
RELATIVE ELEVATION FROM POSE
112
UPDATE HMD POSE
102b
HMD ABSOLUTE Z - ELEVATION
104b
(t=0)

EXTENDED REALITY (XR) SYSTEM WITH BODY-CENTRIC POSE ESTIMATION USING ALTIMETER RELATIVE ELEVATION

INCORPORATION BY REFERENCE

This application claims priority to PCT Application No. PCT/US2023/068258, which claims priority to U.S. Provisional Application Ser. No. 63/366,191, filed on Jun. 10, 2022. The contents of the above-referenced patent applications are hereby expressly and fully incorporated by reference in their entirety.

TECHNICAL FIELD

The present disclosure relates to systems and methods to estimate the pose of a user of an extended reality (XR) system.

BACKGROUND

Modern computing and display technologies have facilitated the development of so-called extended reality (XR) systems that create an environment for a user in which some or all of the environment is generated by presenting digitally reproduced images (e.g., virtual objects) to a user in a manner where they seem to be, or may be perceived as, real. XR systems may be useful for many applications, spanning the fields of scientific visualization, medical training, engineering design and prototyping, tele-manipulation and telepresence, and personal entertainment. An XR system may include, e.g., a virtual reality (VR) system, an augmented reality (AR) system, or a mixed reality (MR) system. A VR system typically involves presentation of virtual objects to a user without transparency to other actual real-world visual input, whereas an AR or MR system typically involves presentation of virtual objects to a user in relation to real objects of the physical world.

XR systems may include a user interface, such as, e.g., a head-mounted display device (HMD), that includes the necessary optical and electronic components for presenting virtual objects to the eyes of the user. XR systems may also generate audio that is played for the user to hear, or may control a tactile (or haptic) interface, enabling the user to experience touch sensations that the user senses or perceives as feeling a virtual object. XR systems may also include one or more hand-held controls that enable the user to interact with certain aspects of the AR system, e.g., virtual objects presented by the AR system to the user. XR systems may also include a compute pack that can be worn by the user remotely from the user's head, e.g., on the torso of the user in a backpack-style configuration or on the hip of the user in a belt-coupling style configuration. The compute pack may assist the XR system in processing, caching, and storage of data used to present virtual objects to the user.

In XR systems, detection or calculation of the position and/or orientation (pose) of the HMD can facilitate the rendering of virtual objects, such that they appear to occupy a space in the real world in a manner that makes sense to the user. In addition, detection of the position and/or orientation (pose) of the hand-held control in relation to the HMD may also facilitate the presentation of virtual objects to the user to enable the user to interact with virtual objects efficiently. As the user's head, and thus the HMD, moves around in the real world, the virtual objects may be re-rendered as a function of HMD pose, such that the virtual objects appear to remain stable relative to the real world.

For XR applications, placement of virtual objects in spatial relation to physical objects (e.g., presented to appear spatially proximate a physical object in two- or three-dimensions) is a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the XR system to render virtual objects that appear uniform and/or as smooth motion to the end user.

Head tracking accuracy and latency (i.e., the elapsed time between when the user moves his or her head and the time when virtual objects get updated and displayed to the user) have been challenges for XR systems. Especially for XR systems that fill a substantial portion of the user's visual field with virtual objects, it is critical that the accuracy of head-tracking is high and that the overall system latency is very low from the first detection of head motion to the updating of the light that is delivered to the user. If the latency is high, the XR system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to accurately tracking the head of the user with minimal latency, in the case where the XR system includes a hand-held control, the XR system must recognize a physical location of the hand-held control and correlate the physical coordinates of the hand-held control to virtual coordinates corresponding to one or more virtual objects being displayed by the HMD to the user. This requires highly accurate sensors and sensor recognition systems that track a position and orientation of hand-held control at rapid rates.

Thus, XR systems must determine the poses of the HMD and the hand-held control at satisfactory speed or precision standards.

In one current approach, an XR system employs a ground truth sensor system that comprises a combination of Inertial Measurement Units (IMUs) and one or more ground truth sensors carried by the HMD and hand-held control, the outputs of which are combined in a sensor fusion technique that accurately tracks the poses of the HMD and hand-held control with minimal latency. In particular, each IMU may contain one or more gyroscopes, one or more accelerometers, and/or one or more magnetometers) that output pose data indicating the absolute poses of the HMD and the hand-held control at a relatively high frequency (e.g., 1000 Hz). As such, the HMD and hand-held control poses may be updated with minimal latency. However, data from devices, such as IMUs, tends to be somewhat noisy and susceptible to pose estimation drift. For a relatively short time window, less than 100 ms, the pose data output by the IMU may be quite useful in estimating pose, but outside of this relatively short time window, the IMUs may become unstable due to the pose estimation drift. However, the ground truth sensor(s) output pose data that accurately indicates poses of the HMD and the hand-held control at a relatively low frequency (e.g., 30 Hz). Thus, the pose data from these ground truth sensors can be used to stabilize the IMUs by correcting their pose estimation drift, such that pose data output by the IMUs is more accurate outside of the relatively short time window, and thus, the ground truth sensor assembly continually outputs accurate pose data that accurately indicates the absolute poses of the HMD and hand-held control.

However, there may be short periods of time where the ground truth sensor system loses pose or tracking, such that the IMUs are left to drift in position. For example, in one current implementation, a computer vision-based solution (e.g., Visual Inertial Odometry (VIO)) utilizes a combination of cameras and IMUs to accurately determine the absolute poses of the HMD and hand-held control within a relatively short time window, while a combination of an LED array carried by the hand-held control and one or more cameras carried by the HMD is used to visually track the pose of the hand-held control relative to the HMD (i.e., localize the hand-held control relative to the HMD) while the LED array is in the field of view of the cameras. However, computer vision-based systems, such as VIO systems, are susceptible to low lighting conditions, which may result in degraded performance and loss of features to track. Very bright lighting conditions (such as in sunny outdoor environment) can cause overexposure, leaving the computer vision-based systems also susceptible. In additional to adverse lighting conditions or lack of tracking features in the environment, the position of the hand-held control outside of the field of vision of the cameras located on the HMD limits the visual tracking of the LED array located on the hand-held control, thereby making it difficult to determine the pose of the hand-held control relative to the HMD. When the computer vision-based system fails, such that the ground truth on the hand-held control is lost, the IMU on the hand-held control will drift in position in a dead reckoning state, thereby degrading the user experience, and ultimately, suspending user interaction activities of the XR system until the computer vision-based system tracking of the hand-held control is regained. Furthermore, when the hand-held control (and the associated LED array) is located outside of the field of view of the cameras carried by the HMD, tracking of the hand-held control relative to the HMD may be lost, which may similarly degrade the user experience. Furthermore, when the hand-held control is finally brought back into the field of the view of the cameras carried by the HMD, additional computational power is required to re-locate the hand-held control within the entire field of view of the camera(s) to re-initiate tracking of the LED array.

There, thus, remains a need to provide or more effective and efficient means for providing a ground truth to IMUs in an XR system.

BRIEF DESCRIPTION OF DRAWINGS

The drawings illustrate the design and utility of embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 8 is a flow diagram of one technique used by the XR system of FIG. 1 to correct pose data output by a ground truth sensor system of the XR system of FIG. 1 using altimeter data output by the altimeter carried by the HMD and the altimeter carried by the hand-held control;

DETAILED DESCRIPTION

Figure 1:
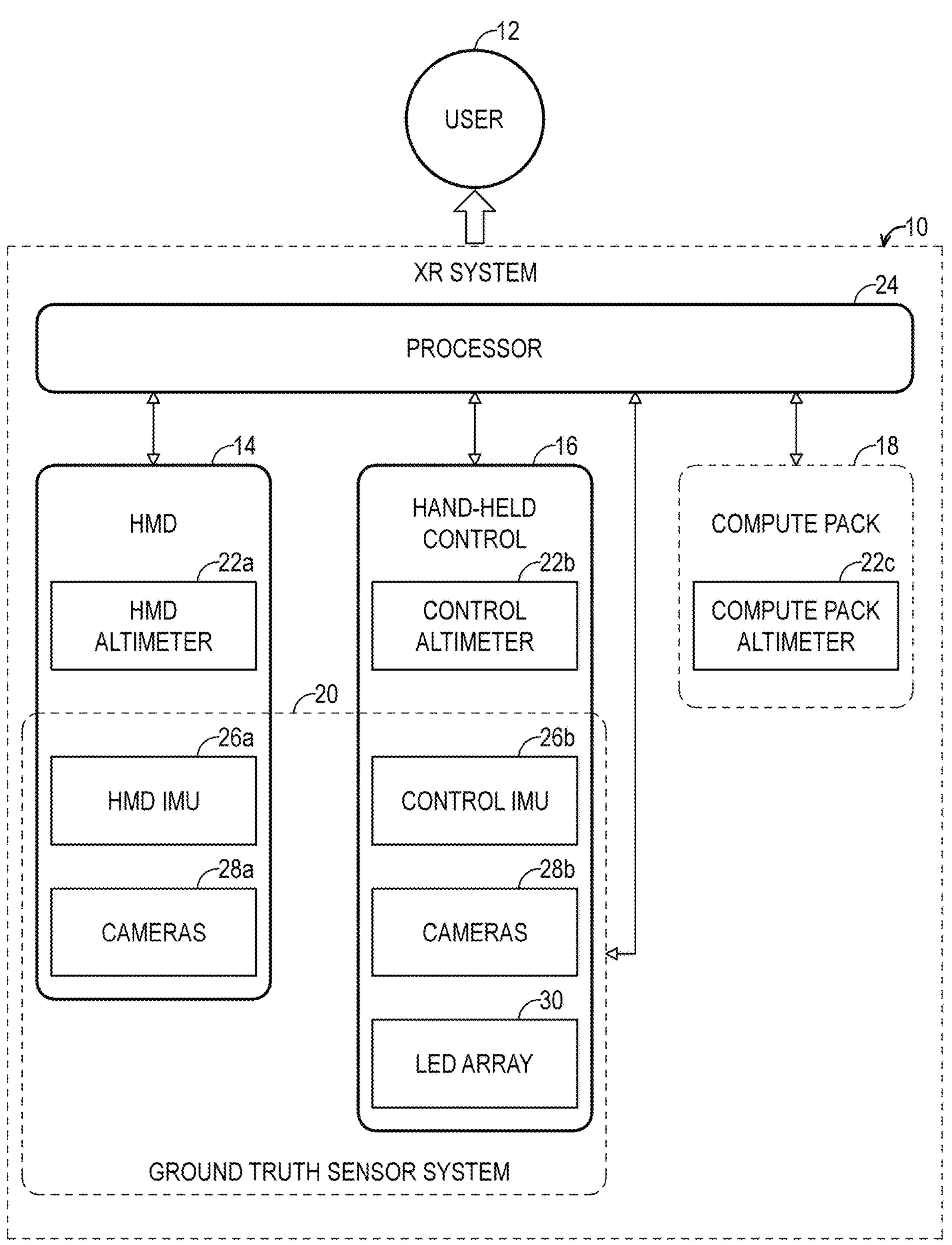
FIG. 1 is a block diagram of an extended reality (XR) system constructed in accordance with one of embodiment of the present invention.

Referring to FIG. 1, an extended reality (XR) system 10 for use by a user 12 generally comprises a head-mounted display (HMD) 14, a hand-held control 16, a compute pack 18, a ground truth sensor system 20, a first altimeter **22*a* carried by the HMD 14 (referred to hereinafter as an "HMD altimeter 22*a*"), a second altimeter 22*b* carried by the hand-held control 16 (referred to hereinafter as a "control altimeter"), a third altimeter 22*c* carried by the compute pack 18 (referred to hereinafter as a "compute pack altimeter"), and at least one processor 24** (only one shown).

The HMD 14 is configured for displaying virtual content to a user in a conventional manner. In one embodiment, virtual content has a user-interactable object with which the user can use the hand-held control 16 to interact. The compute pack 18 is configured for being worn by the user remotely from the HMD 14, e.g., on the hip of the user. The compute pack 18 comprises additional computing and storage power for facilitating the presentation of the virtual content by the HMD 14 to the user.

The ground truth sensor system 20 is configured for outputting ground truth pose data respectively indicative of an absolute pose of the HMD 14 and an absolute pose of the hand-held control 16, as well as the relative pose between the HMD 14 and hand-held control 16. At the least, the ground truth pose data includes elevation components (z-component) indicative of the absolute elevations of the HMD 14 and hand-held control 16, although the ground truth pose data preferably also includes azimuthal components (x- and y-components) indicative of the absolute positions of the HMD 14 and hand-held control 16 in a plane (x-y plane). In the illustrated embodiment, the ground truth sensor system 20 is a computer vision-based sensor fusion system, although other types of ground truth sensor systems can be envisioned, e.g., an electromagnetic-based sensor fusion systems, such as those described in U.S. patent application Ser. No. 15/425,837, entitled "Systems and Methods for Augmented Reality" and U.S. patent application Ser. No. 16/973,971, entitled "Augmented Reality Deep Gesture Network," which are expressly incorporated herein by reference.

The ground truth sensor system 20 comprises a first noisy sensor 26*a* (e.g., an Inertial Measurement Unit (IMU)) carried by the HMD 14 (hereinafter referred to as an "HMD IMU"), a second noisy sensor 26*b* (e.g., an IMU) carried by the hand-held control 16 (hereinafter referred to as a "control IMU"), and a truth sensor assembly comprising one or more cameras 28*a* carried by the HMD 14 (hereinafter, the "HMD cameras"), one or more cameras 28*b* carried by the hand-held control 16 (hereinafter, the "control cameras"), and a light emitting diode (LED) array 30 carried by the hand-held control 16. In the illustrated embodiment, the HMD IMU 26*a* and HMD cameras 28*a*, and the control IMU 26*b* and control cameras 28*b*, are respectively arranged with one or more processors (in this case, the two processors respectively in the HMD 14 and hand-held control 16), as two independent Visual Inertial Odometry (VIO) systems. Pose data acquired by the VIO systems respectively associated with the HMD 14 and hand-held control 16 may then be transmitted to the processor 24 (which may be located in the compute pack 18) via a wired or wireless link.

The HMD IMU 26*a* is configured for outputting noisy pose data indicative of the absolute pose of the HMD 14, while the control IMU 26*b* is configured for outputting noisy pose data indicative of the absolute pose of the hand-held control 16. At the least, the noisy pose data has an elevation component (z-component) indicative the absolute elevations of the HMD 14 and hand-held control 16, but preferably also has azimuthal components (x- and y-components) indicative of the positions of the HMD 14 and hand-held control 16 in a plane (x-y plane). While each of the IMUs 26*a*, 26*b* may output the noisy pose data at a relatively high frequency (e.g., greater than 100 Hz, such as 1000 Hz), the IMUs 26*a*, 26*b* are susceptible to pose estimation drift outside of a relatively short time window (e.g., less than 100 ms).

However, the HMD cameras 28*a* and control cameras 28*b* are more accurate than the IMUs 26*a*, 26*b*, and thus, more accurately tracks the absolute positions of the HMD 14 and hand-held control 16 (e.g., outputs pose data having elevation components indicative the ground truth absolute elevation of the hand-held control 16). As such, the HMD cameras 28*a* and control cameras 28*b* may serve as noise correction sensors that can be used to correct the IMUs 26*a*, 26*b* outside of this relatively short time window by periodically correcting the output of the IMUs 26*a*, 26*b* when they drift to provide more accurate absolute poses of the HMD 14 and the hand-held control 16. Whereas each of the IMUs 26*a*, 26*b* may output the noisy pose data at a relatively high frequency, the cameras 28*a*, 28*b* may output corrective pose data at a relatively low frequency (e.g., less than 100 Hz, such as 30 Hz). The frequency at which the IMUs 26*a*, 26*b* output the noisy pose data may be at least three times higher than the frequency at which the cameras 28*a*, 28*b* output the corrective pose data.

The HMD cameras 28*b* and LED array 30 are arranged with the processor 24 as an LED tracking system. In particular, the LED tracking system is configured for outputting pose data that is accurately indicative of the relative pose between the HMD 14 and the hand-held control 16 by identifying a specific identifiable pattern (i.e., constellation) associated with the LED array 30 on the hand-held control 16 via the cameras 28*a* located on the HMD 14 when the hand-held control 16 is in the field of view of the cameras 28*a*.

Further details of the ground truth sensor system 20 are described in U.S. Pat. No. 10,860,090, which is expressly incorporated herein by reference.

Significantly, because the altimeters 22*a*-22*c* are respectively built into the HMD 14, hand-held control 16, and compute pack 18, the relative elevations between the HMD 14, hand-held control 16, and compute pack 18 (the locations of which can be closely correlated to the locations of the altimeters 22*a*-22*c*) can be determined. In particular, the HMD altimeter 22*a* is configured for outputting atmospheric pressure data indicative of the absolute elevation of the HMD 14; the control altimeter 22*b* is configured for outputting atmospheric pressure data indicative of the absolute elevation of the hand-held control 16; and the compute pack altimeter 22*c* is configured for outputting atmospheric pressure data indicative of the absolute elevation of the compute pack 18. Thus, with knowledge of the absolute elevations of the HMD 14, hand-held control 16, and compute pack 18 derived from the atmospheric pressure data output by the altimeters 22*a*-22*c*, the processor 24 may compute the relative elevations (or z-displacement) between the HMD 14, hand-held control 16, and compute pack 18. It should be appreciated that the use of multiple altimeters to determine relative elevations between the HMD 14, hand-held control 16, and compute pack 18 eliminates environmental noise or changes in pressure, thereby providing a more accurate change in elevation between the HMD 14, hand-held control 16, and compute pack 18. Furthermore, because all of the altimeters 22*a*-22*c* are entirely contained within the wearable components of the XR system 10 (i.e., built into the HMD 14, hand-held control 16, and compute pack 18), the need for any external components is eliminated, thereby obviating the need for synchronization with the wearable portion of the XR system 10 and associated cables and/or wireless links.

As will be discussed in further detail below, the relative elevation between the HMD 14 and hand-held control 16 derived from the atmospheric pressure data output by the HMD altimeter 22*a* and the control altimeter 22*b* may be used to correct the drift in the elevation component of noisy pose data output by one or more sensors, and in this case, the noisy pose data output by the control IMU 26*b* when the ground truth sensor system 20 fails (e.g., the VIO system corresponding to the hand-held control 16 (i.e., the control cameras 28*b*) fail due to adverse lighting conditions or lack of tracking features in the environment), and is, thus, unable to correct the noisy pose data output by the control IMU 26*b*. As will also be discussed in further detail below, the relative elevation between the HMD 14 and hand-held control 16 derived from the atmospheric pressure data output by the HMD altimeter 22*a* and the control altimeter 22*b* may also be used to localize the hand-held control 16 (with or without the use of the control IMU 26*b*) when the hand-held control 16 has been moved out of the field of view of the HMD cameras 28*a* to continue to track the hand-held control 16 until the hand-held control 16 reenters the field of view of the HMD cameras 28*a*). As will also be discussed in further detail below, the relative elevation between the HMD 14 and hand-held control 16 and the relative elevation between the HMD 14 and compute pack 18 derived from the atmospheric pressure data output by the HMD altimeter 22*a*, the control altimeter 22*b*, and the compute pack altimeter 22*c* can be used to estimate the body pose or state of the user, and ultimately, determine and assess a physical activity performed by the user.

Because each of the altimeters 22*a*-22*c* has a resolution of a few centimeters and outputs the atmospheric pressure data with a significant initial offset error component, the processor 24 is configured for computing a relative elevation error of the determined relative elevation between the HMD altimeter 22*a* and the control altimeter 22*b*, and thus, the HMD 14 and hand-held control 16, as well as between the HMD altimeter 22*a* and the compute pack altimeter 22*c*, and thus, the HMD 14 and the compute pack 18.

Figure 2:
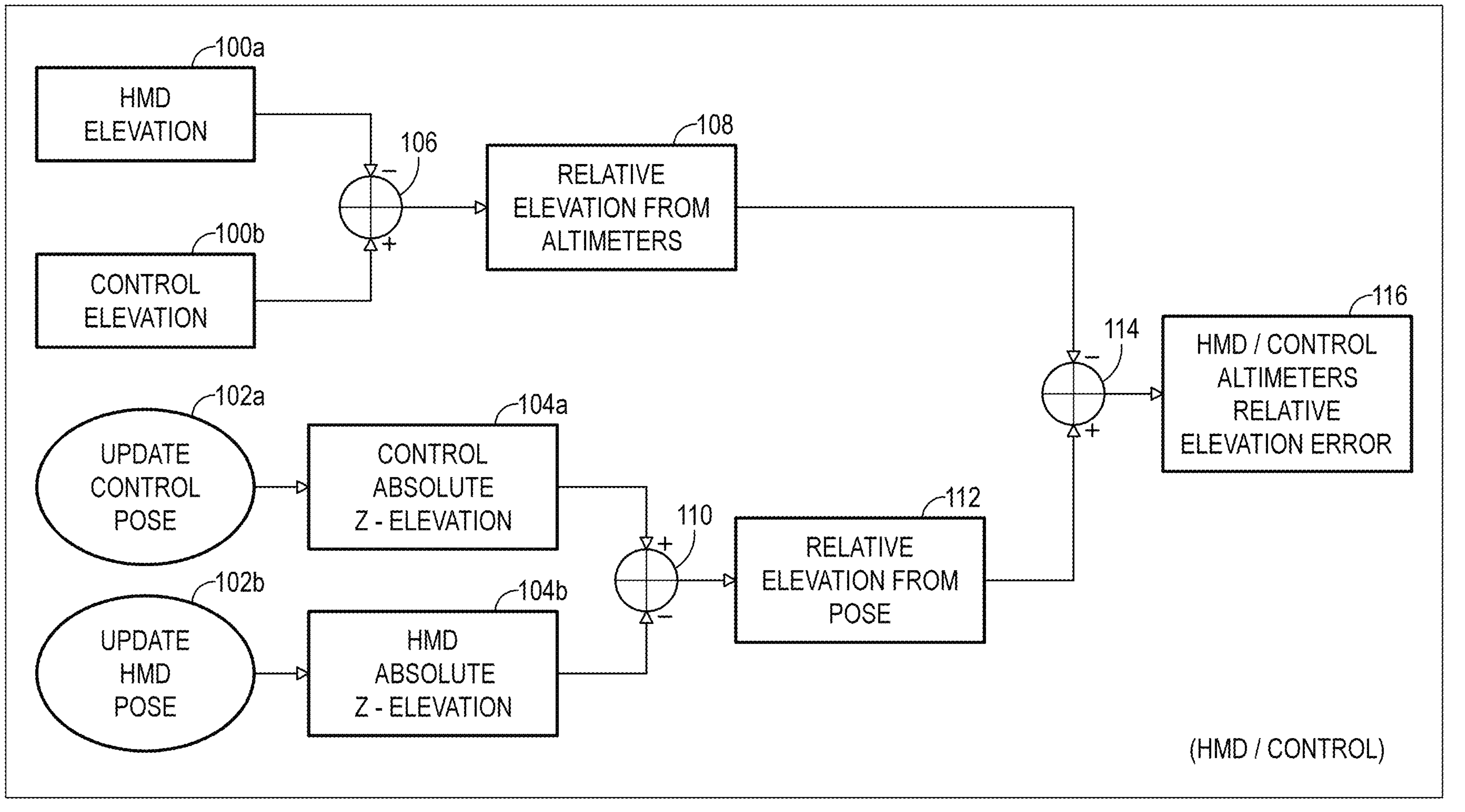
FIG. 2 is a flow diagram of one technique used by the XR system calibrate a relative elevation error of an altimeter carried by a head-mounted display (HMD) of the XR system of FIG. 1 and an altimeter carried by a hand-held control of the XR system of FIG. 1.

In particular, with reference to FIG. 2, one technique using the more accurate ground truth sensor system 20 to calibrate the relative elevation error of the HMD altimeter 22*a* and the control altimeter 22*b*, and thus, the HMD 14 and hand-held control 16, will be described.

First, the HMD altimeter 22*a* outputs atmospheric pressure data indicative of the absolute elevation of the HMD 14 (100*a*) and the control altimeter 22*b* outputs atmospheric pressure data indicative of the absolute elevation of the hand-held control 16 (100*b*). The processor 24 also updates the pose of the HMD 14 (102*a*), such that the ground truth sensor system 20 outputs ground truth pose data comprising an elevation component indicative of the absolute ground truth elevation of the HMD 14 (104*a*), and updates the pose of the hand-held control 16 (102*b*), such that the ground truth sensor system 20 outputs ground truth pose data having an elevation component indicative of the absolute ground truth elevation of the hand-held control 16 (104*b*).

Preferably, the altimeters 22*a*, 22*b* and ground truth sensor system 20 are operated to output atmospheric pressure data and ground truth pose data at the same time, such that atmospheric pressure data output by the HMD altimeter 22*a* and the ground truth pose data output by the ground truth sensor system 20 are both correlated to the same position of the HMD altimeter 22*a*, while the atmospheric pressure data output by the control altimeter 22*b* and the ground truth pose data output by the ground truth sensor system 20 are both correlated to the same position of the control altimeter 22*b*.

The processor 24 then determines a relative elevation between the HMD altimeter 22*a* and the control altimeter 22*b* (108) based on (and in this embodiment, by applying a subtraction function 106 to) the atmospheric pressure data output by the HMD altimeter 22*a* (100*a*) and the atmospheric pressure data output by the control altimeter 22*b* (100*b*) in accordance with the equation:

$$\Delta\text{Elevation}_{control\text{-}HMD\text{-}alt} = \text{Elevation}_{control\text{-}alt} - \text{Elevation}_{HMD\text{-}alt}, \quad [1]$$

where $\Delta\text{Elevation}_{control\text{-}HMD\text{-}alt}$ is the relative elevation between the HMD altimeter 22*a* and the control altimeter 22*b*, $\text{Elevation}_{control\text{-}alt}$ is the absolute elevation of the control altimeter 22*b*, and $\text{Elevation}_{HMD\text{-}alt}$ is the absolute elevation of the HMD altimeter 22*a*.

The processor 24 also determines a relative ground truth elevation between the HMD 14 and hand-held control 16 (112) based on ground truth pose data output by the ground truth sensor system 20 (and in this embodiment, by applying a subtraction function 110 to) the absolute ground truth elevation of the HMD 14 (104*a*) and the absolute ground truth elevation of the hand-held control 16 (104*b*) in accordance with the equation:

$$\Delta\text{Elevation}_{control\text{-}HMD\text{-}truth} = \text{Elevation}_{control\text{-}truth} - \text{Elevation}_{HMD\text{-}truth}, \quad [2]$$

where $\Delta\text{Elevation}_{control\text{-}HMD\text{-}truth}$ is the relative ground truth elevation between the HMD 14 and the hand-held control 16, $\text{Elevation}_{control\text{-}truth}$ is the absolute ground truth elevation of the hand-held control 16, and $\text{Elevation}_{HMD\text{-}Truth}$ the absolute ground truth elevation of the HMD 14.

Notably, correspondence between a relative ground truth elevation between the HMD altimeter 22*a* and the control altimeter 22*b* and the relative ground truth elevation between the HMD 14 and hand-held control 16 (112) derived from the ground truth pose data output by the ground truth sensor system 20 can be inferred.

Lastly, the processor 24 computes a relative elevation error 116 of the HMD altimeter 22*a* and control altimeter 22*b* based on (and in this embodiment, by applying a subtraction function 114 to) the determined relative elevation between the HMD altimeter 22*a* and the control altimeter 22*b* (108) and the determined relative ground truth elevation between the HMD 14 and hand-held control 16 (112) (i.e., the relative ground truth elevation between the HMD altimeter 22*a* and the control altimeter 22*b*) in accordance with the equation:

$$\text{error}_{alt\text{-}control} = \Delta\text{Elevation}_{control\text{-}HMD\text{-}truth} - \Delta\text{Elevation}_{control\text{-}HMD\text{-}alt}, \quad [3]$$

where $\text{error}_{alt\text{-}control}$ is the relative elevation error 116 of the HMD altimeter 22*a* and control altimeter 22*b*, and $\Delta\text{Elevation}_{control\text{-}HMD\text{-}truth}$ and $\Delta\text{Elevation}_{control\text{-}HMD\text{-}Alt}$ have been previously defined respectively in equations [2] and [1] above.

The calibration of the of relative elevation error of the HMD altimeter 22*a* and the control altimeter 22*b* can be made more robust by computing numerous relative elevation errors of the HMD altimeter 22*a* and control altimeter 22*b* over numerous acquired samples of the atmospheric pressure data and ground truth pose data, and averaging the relative elevation errors to yield a more accurate averaged relative elevation error of the HMD altimeter 22*a* and the control altimeter 22*b*.

The corrected relative elevation between the HMD 14 and the hand-held control 16 can then be computed based on (and in this embodiment, by applying a summation function to) the determined relative elevation between the HMD altimeter 22*a* and the control altimeter 22*b* (108) and the relative elevation error of the HMD altimeter 22*a* and the control altimeter 22*b* (116) in accordance with the equation:

$$\Delta \text{Elevation}_{HMD-control} = \Delta \text{Elevation}_{control-HMD-alt} + \text{error}_{alt-control}, \quad [4]$$

where $\text{Elevation}_{HMD\text{-}control}$ is the relative elevation between the HMD altimeter 22*a* and the control altimeter 22*b*, and $\Delta\text{Elevation}_{control\text{-}HMD\text{-}alt}$ and $\text{error}_{alt\text{-}control}$ have been previously defined in equations [1] and [3] above.

Figure 3:
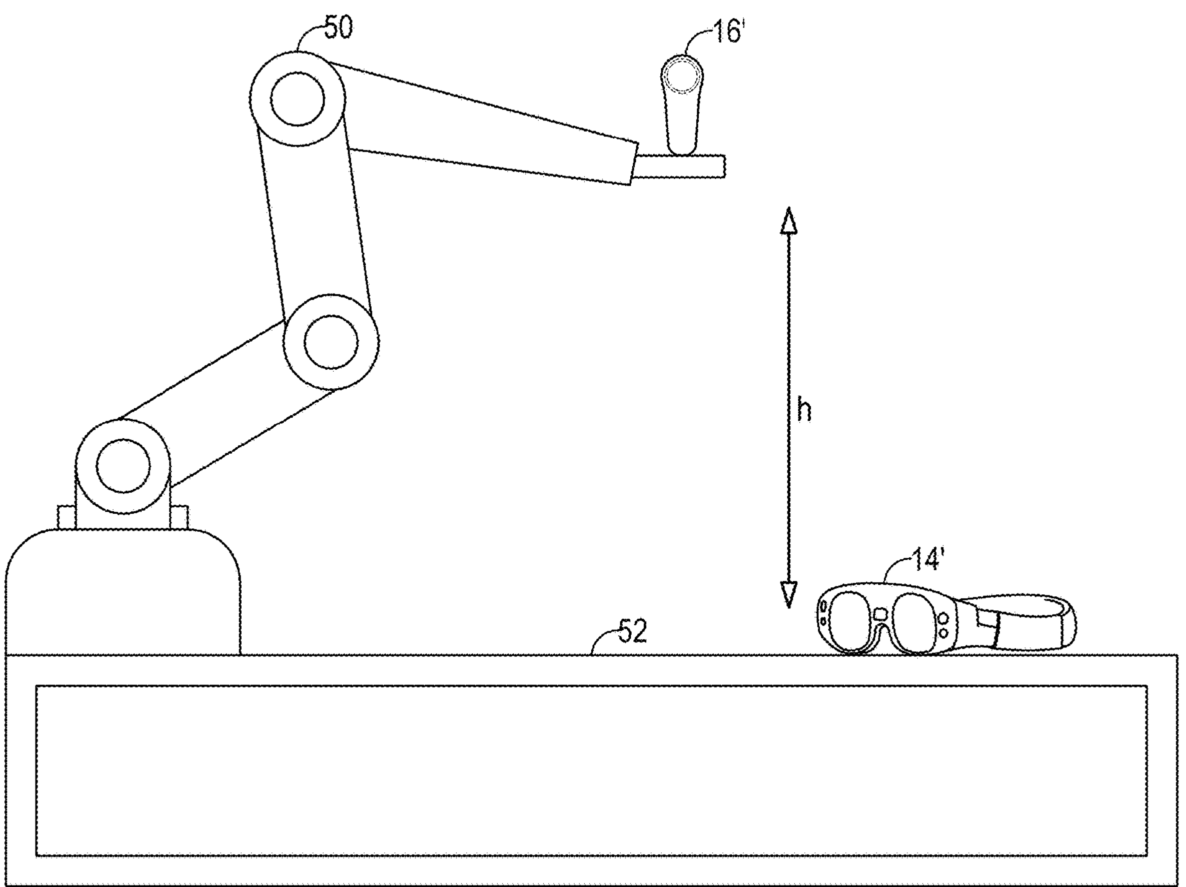
FIG. 3 is a profile view of an experimental setup for determining the accuracy of the XR system in computing a relative elevation error between the altimeters of FIG. 2.
Figure 4:
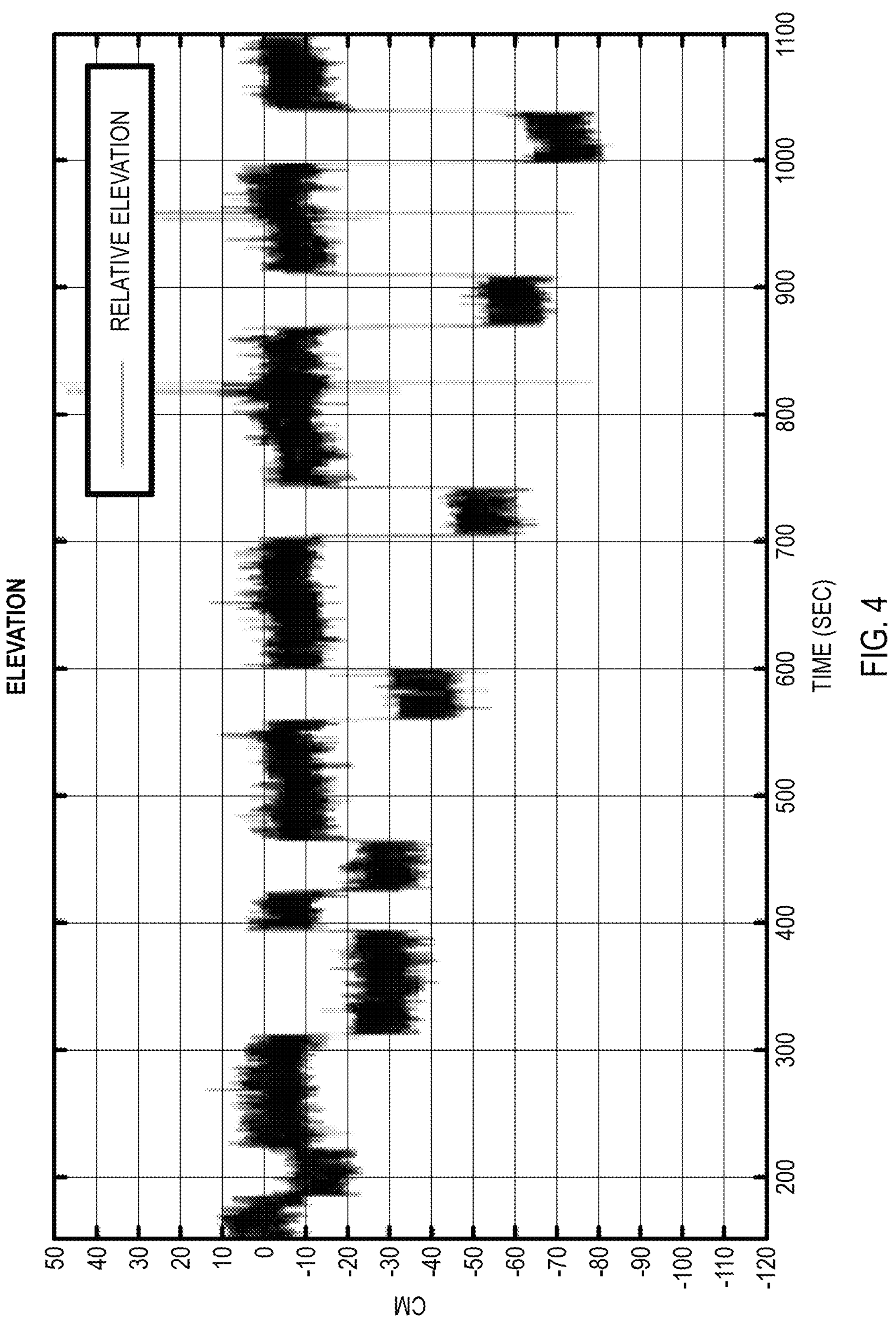
FIG. 4 is a plot illustrating the computed relative elevation errors between the altimeters of the experimental setup of FIG. 2 over different known relative elevations between the altimeters of FIG. 2.

The accuracy of the computation of the relative elevation between an HMD altimeter and a control altimeter based on atmospheric pressure data output by the HMD altimeter 22*a* and control altimeter 22*b* was verified in an experiment involving mounting a hand-held control device 16' having an altimeter to a robotic arm 50, while an HMD 14' having an altimeter is placed on a stable surface 52, as illustrated in FIG. 3. Thus, the HMD 14' is static, while the robotic arm 50 is operated to translate the hand-held control 16 up or down relative to the stable surface 52. The relative elevation h between the HMD 14' and hand-held control device 16' was then computed in accordance with equation [1] for different relative elevations h (h=10 cm, 20 cm, 30 cm, 40 cm, 50 cm, and 60 cm) using the atmospheric pressure data output by the altimeters respectively carried by the HMD 14' and hand-held control 16', as illustrated in FIG. 4, and then compared with the expected (or actual) relative elevation h between the HMD 14' and hand-held control 16', as tabulated in Table 1 below.

TABLE 1

Measured Relative Z-Elevation vs Expected Results

| Expected (cm) | Measured (cm) |
|---|---|
| 10 | 15 |
| 20 | 23 |
| 30 | 32 |
| 40 | 44 |
| 50 | 53 |
| 60 | 64 |

Assuming that the known relative elevation error of the altimeters respectively carried by the HMD 14' and control altimeter 16' has been computed in accordance with equation [3] to be 3.5 cm, the corrected relative elevation h between the HMD 14' and the hand-held control 16' was computed in accordance with equation [4] and tabulated in Table 2 below.

TABLE 2

Measured and Corrected Relative Z-Elevation

| Expected (cm) | Measured (cm) | Error (cm) | Corrected Z-Elevation (cm) |
|---|---|---|---|
| 10 | 15 | 3.5 | 11.5 |
| 20 | 23 | 3.5 | 19.5 |
| 30 | 32 | 3.5 | 28.5 |
| 40 | 44 | 3.5 | 40.5 |
| 50 | 53 | 3.5 | 49.5 |

As can be seen from Table 2, the corrected relative elevation h between the HMD 14' and the hand-held control 16' has a 1.5 cm accuracy.

Figure 5:
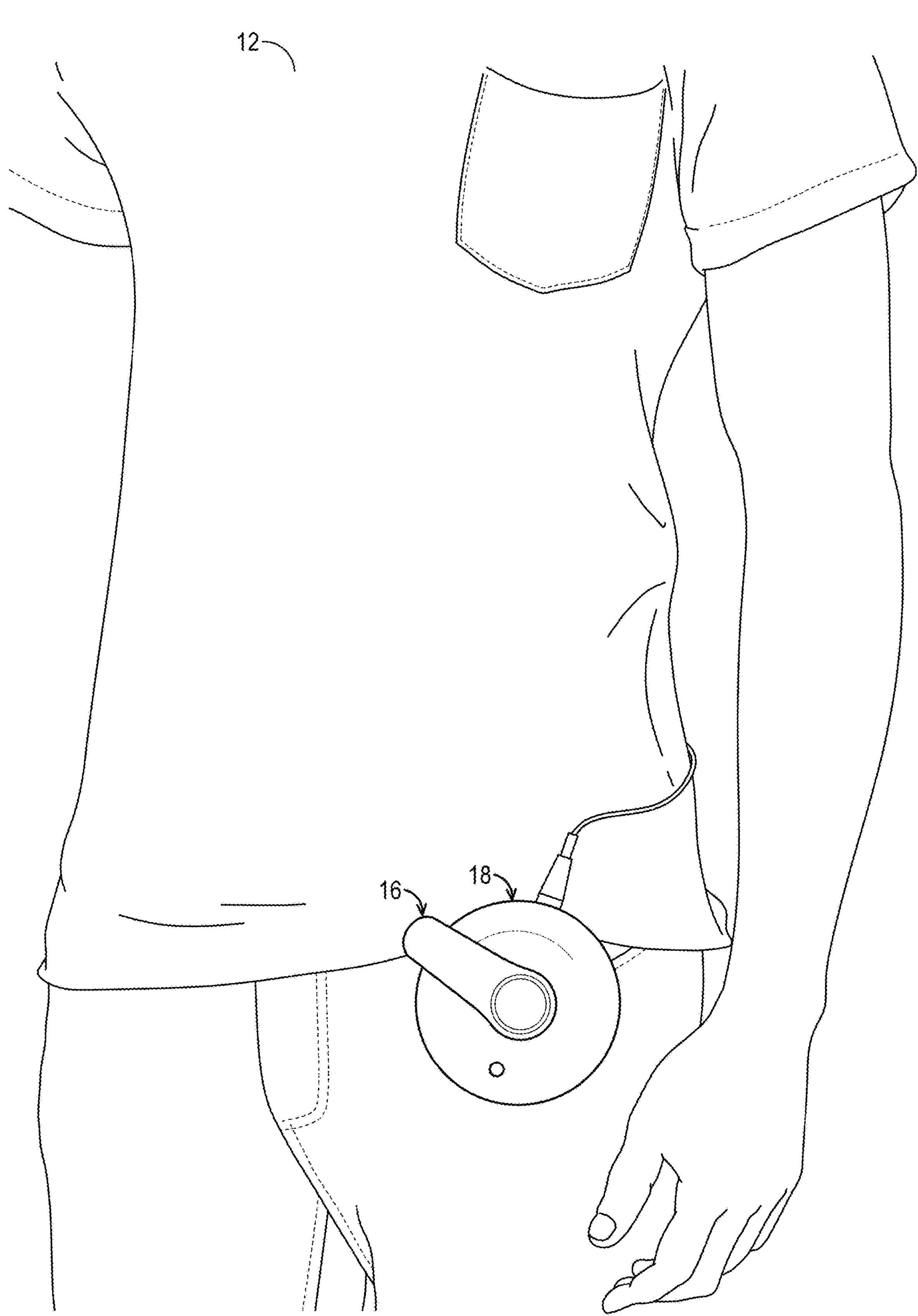
FIG. 5 is a pictorial illustrating the placement of the hand-held control next to a compute pack of the XR system in order to calibrate the relative error of an altimeter carried by a compute pack and the altimeter carried by the HMD.
Figure 6:
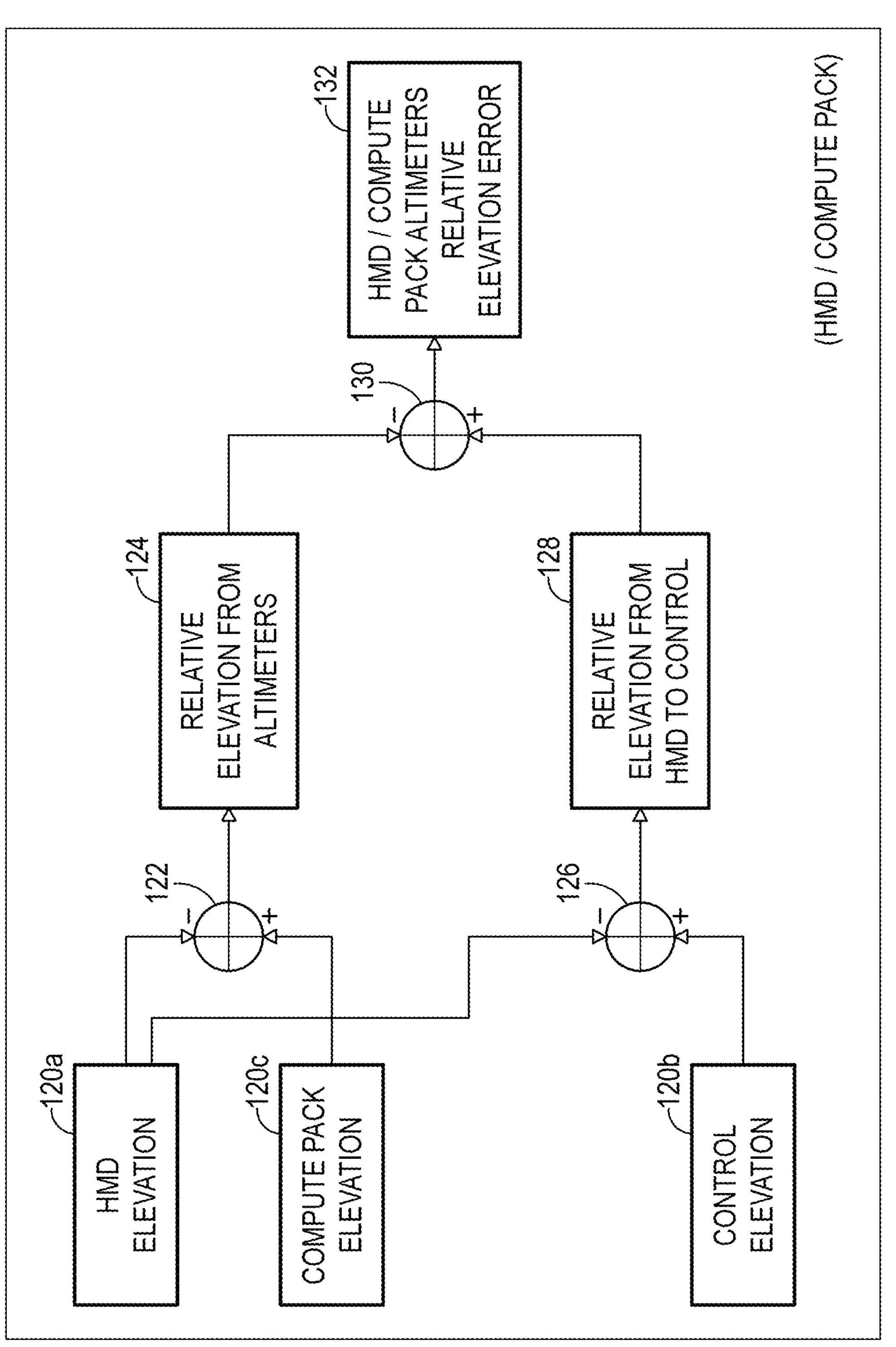
FIG. 6 is a flow diagram of one technique used by the XR system calibrate a relative elevation error of an altimeter carried by a head-mounted display (HMD) of the XR system of FIG. 1 and an altimeter carried by a compute pack of the XR system of FIG. 1.

With reference to FIGS. 5 and 6, one technique using the now-calibrated relative elevation error of the HMD altimeter 22*a* and the control altimeter 22*b* to calibrate the relative elevation error of the HMD altimeter 22*a* and the compute pack altimeter 22*c*, and thus, the HMD 14 and compute pack 18, will be described.

First, as illustrated in FIG. 5, the user is prompted to place the hand-held control 16 (along with the second altimeter 22*b*) immediately lateral to, and at the same elevation as, compute pack 18.

Referring specifically to FIG. 6, as the hand-held control 16 is placed on the compute pack 18, the HMD altimeter 22*a* outputs atmospheric pressure data indicative of the absolute elevation of the HMD 14 (120*a*), the control altimeter 22*b* outputs atmospheric pressure data indicative of the absolute elevation of the hand-held control 16 (120*b*), and the computer pack altimeter 22*c* outputs atmospheric pressure data indicative of the absolute elevation of the computer pack 18 (120*c*).

The processor 24 then determines a relative elevation between the HMD altimeter 22*a* and the compute pack altimeter 22*c* (124) based on (and in this embodiment, by applying a subtraction function 122 to) the atmospheric pressure data output by the HMD altimeter 22*a* (120*a*) and the atmospheric pressure data output by the compute pack altimeter 22*c* (120*c*) in accordance with the equation:

$$\Delta \text{Elevation}_{compute-HMD-alt} = \text{Elevation}_{compute-alt} - \text{Elevation}_{HMD-alt}, \quad [5]$$

where $\Delta\text{Elevation}_{compute\text{-}HMD\text{-}alt}$ is the relative elevation between the HMD altimeter 22*a* and the compute pack altimeter 22*c*, $\text{Elevation}_{compute\text{-}alt}$ is the absolute elevation of the compute pack altimeter 22*c*, and $\text{Elevation}_{HMD\text{-}alt}$ has been previously in equation [1].

Because the compute pack 18 is at the same elevation as the hand-held control 16, the previously calibrated control altimeter 22*b* may serve as a proxy to the yet to be calibrated compute pack altimeter 22*c*, and its output may thus serve as a ground truth for the output of the compute pack altimeter 22*c*. In particular, the processor 24 determines a relative ground truth elevation between the HMD 14 and compute pack 18 (128) based on (and in this embodiment, by applying a subtraction function 126 to) the atmospheric pressure data output by the HMD altimeter 22*a* (120*a*) and the atmospheric pressure data output by the control altimeter 22*b* (120*b*) in accordance with equation [1].

Lastly, the processor 24 computes a relative elevation error 132 of the HMD altimeter 22*a* and compute pack altimeter 22*c* based on (and in this embodiment, by applying a subtraction function 130 to) the determined relative elevation between the HMD altimeter 22*a* and the compute pack altimeter 22*c* (134) and the determined relative elevation between the HMD altimeter 22*a* and the control altimeter 22*b* (i.e., the determined relative ground truth elevation between the HMD altimeter 22*a* and the compute pack altimeter 22*c* (128) in accordance with the equation:

$$\text{error}_{alt\text{-}compute}=\Delta\text{Elevation}_{compute\text{-}HMD\text{-}alt}-\Delta\text{Elevation}_{control\text{-}HMD\text{-}alt}, \quad [6]$$

where $\text{error}_{alt\text{-}compute}$ is the relative elevation error 134 of the HMD altimeter 22*a* and compute pack altimeter 22*c*, and $\Delta\text{Elevation}_{compute\text{-}HMD\text{-}alt}$ and $\Delta\text{Elevation}_{control\text{-}HMD\text{-}alt}$ have been previously defined respectively in equations [1] and [5] above.

Again, the calibration of the of relative elevation error of the HMD altimeter 22*a* and the compute pack altimeter 22*c* can be made more robust by computing numerous relative elevation errors of the HMD altimeter 22*a* and compute pack altimeter 22*c* over numerous acquired samples of the atmospheric pressure data, and averaging the relative elevation errors to yield a more accurate averaged relative elevation error of the HMD altimeter 22*a* and the compute pack altimeter 22*c*.

The relative elevation between the HMD 14 and the compute pack 18 can then be computed based on (and in this embodiment, by applying a subtraction function to) the determined relative elevation between the HMD altimeter 22*a* and the compute pack altimeter 22*c* and the relative elevation error of the HMD altimeter 22*a* and the compute pack altimeter 22*c* (132) in accordance with the equation:

$$\Delta\text{Elevation}_{HMD\text{-}compute}=\Delta\text{Elevation}_{compute\text{-}HMD\text{-}alt}+\text{error}_{alt\text{-}compute}, \quad [7]$$

where $\Delta\text{Elevation}_{HMD\text{-}compute}$ is the relative elevation between the HMD altimeter 22*a* and the control altimeter 22*b*, and $\Delta\text{Elevation}_{compute\text{-}HMD\text{-}alt}$ and $\text{error}_{alt\text{-}control}$ and $\text{error}_{alt\text{-}compute}$ have been previously respectively in equations [5] and [6] defined above.

Figure 7:
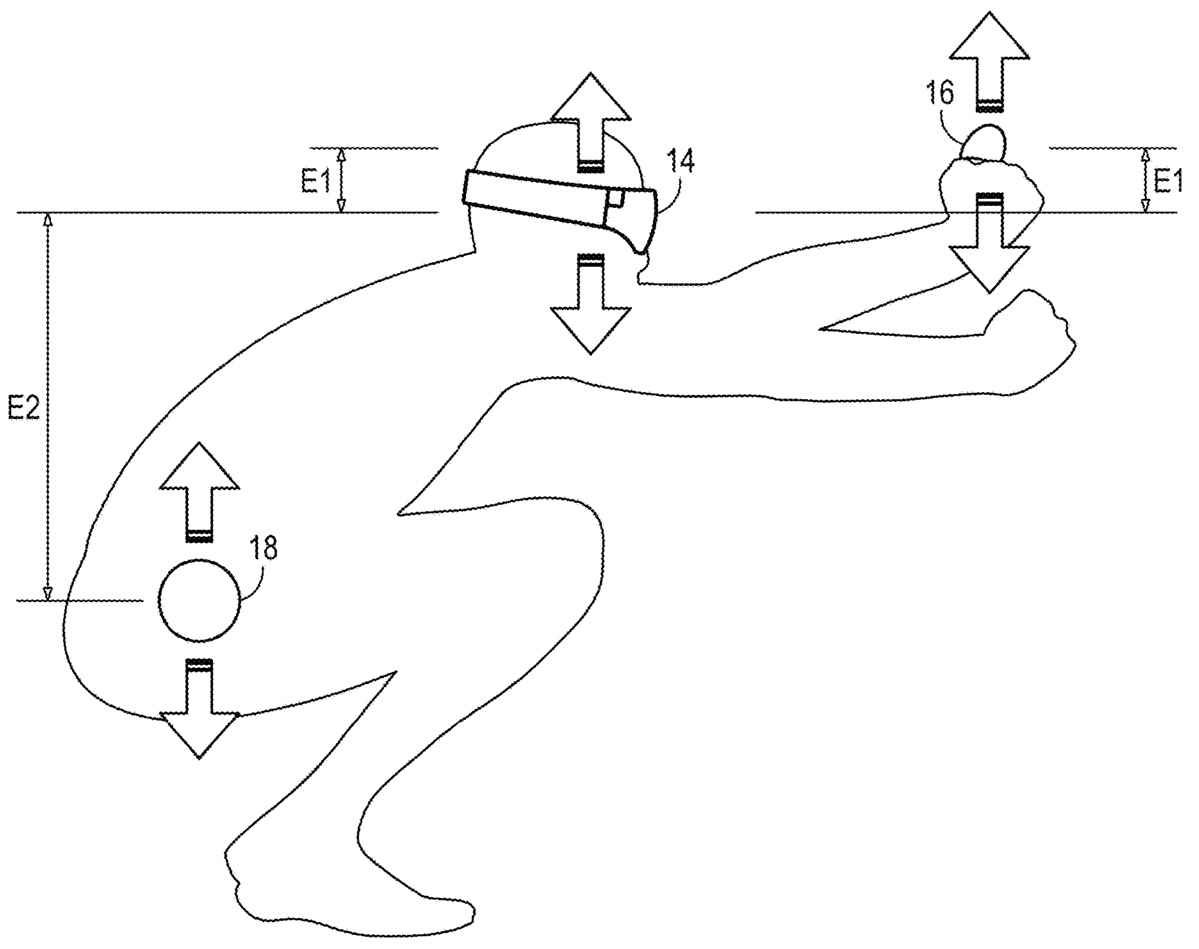
FIG. 7 is a pictorial of a user wearing the XR system of FIG. 1, such that the XR system can determine and assess a physical activity performed by the user.

As briefly discussed above, the relative elevation between the HMD 14 and the hand-held control 16 and the relative elevation between the HMD 14 and the computer pack 18 derived from the atmospheric pressure data output by the HMD altimeter 22*a*, the control altimeter 22*b*, and the compute pack altimeter 22*c* can be used to estimate the body pose or state of the user, and ultimately, determine and assess a physical activity performed by the user, e.g., by assigning a rating to the physical activity, such as a score. In particular, because the resolution of the altimeters 22*a*-22*c* is approximately ±3 cm, the locations of the altimeters 22*a*-22*c*, and thus the HMD 14, hand-held control 16, and compute pack 18, can be correlated to different body parts of the user, and in this embodiment, to the head, hand, and hip of the user. Thus, the body pose of the user can be determined and monitored by tracking a relative elevation E1 between the HMD 14 and the hand-held control 16, and the relative elevation E2 between the HMD 14 and the compute pack 18, as illustrated in FIG. 7.

In one embodiment, the processor 24 monitors the relative elevation E2 between the HMD 14 and the compute pack 18 to determine whether the user is squatting or bending over. For example, if the relative elevation E2 between the HMD 14 and the compute pack 18 is within a first range (e.g., 1-2 feet), the processor 24 may determine that the user is squatting. In contrast, if the relative elevation E2 between the HMD 14 and the compute pack 18 is within a second range (e.g., −1 to 1 feet), the processor 24 may determine that the user is bending over.

In another embodiment, the processor 24 monitors the relative elevation E1 between the HMD 14 and the hand-held control 16 to determine and assess a particular exercise performed by the user. For example, the user may place the hand-held control 16 on the floor (either by holding hand-held control 16 or placing the hand-held control 16 next to their hand) while performing pushups and wearing the HMD 14. The processor 24 may monitor the relative elevation E1 between the HMD 14 and the hand-held control 16 to determine the number and quality of pushups performed by the user. The user may also hold the hand-held control device 13 while performing jumping jacks and wearing the HMD 14. The processor 24 may monitor the relative elevation E1 between the HMD 14 and the hand-held control 16 to determine the number and quality of jumping jacks performed by the user.

In another application, the HMD altimeter 22*a* and/or control altimeter 22*b* in different XR systems 10 worn by different users 12 may be used to determine the relative elevations between the users 12, e.g., to be determine if the users 12 are on located on the same floor or different floors, moving between different floors to load appropriate maps or multiple users within a room that are all doing physical therapy to determine how they are keeping up with the exercises.

As also briefly discussed above, the relative elevation between the HMD 14 and the hand-held control 16 derived from the atmospheric pressure data output by the HMD altimeter 22*a* and the control altimeter 22*b* may be used as a ground truth for the hand-held control 16 to correct the drift in the elevation component of the noisy pose data output by the control IMU 26*b* of the ground truth sensor system 20. The atmospheric pressure data output by the HMD altimeter 22*a* and the control altimeter 22*b* may be used in conjunction with the ground truth sensor system 20 when fully functional, but is most useful when the ground truth sensor system 20 has lost tracking of the hand-held control 16, and is, thus, unable to correct the noisy pose data output by the control IMU 26*b*. Correcting the drift of the control IMU 26*b* in one degree-of-freedom when the ground truth sensor system 20 has lost tracking of the hand-held control 16 results in a 4DOF-type system that limits the pose estimation drift of the control IMU 26*b* in the horizontal plane only, thereby minimizing the drift of the control IMU 26*b*, and ultimately improving the user experience with the XR system 10, e.g., by prolonging the length of time the user 12 experience with the XR system 10 will last while the ground truth sensor system 20 is attempting to gain tracking of the hand-held control 16. As also briefly discussed above, the relative elevation between the HMD 14 and the hand-held control 16 derived from the atmospheric pressure data output by the HMD altimeter 22*a* and the control altimeter 22*b* may be used to localize the hand-held control 16 when the hand-held control 16 to assist the ground truth sensor system 20 in regaining tracking of the hand-held control 16.

With reference now to FIG. 8, one technique using the relative elevation between the HMD 14 and the hand-held control 16 derived from the atmospheric pressure data output by the HMD altimeter 22*a* and the control altimeter 22*b* to correct the drift in the elevation component of the noisy pose data output by the control IMU 26*b* when the ground truth sensor system 20 loses tracking of the hand-held control 16 (e.g., when the VIO system corresponding to the hand-held control 16 fails due to adverse lighting conditions or lack of tracking features in the environment).

Figure 9A:
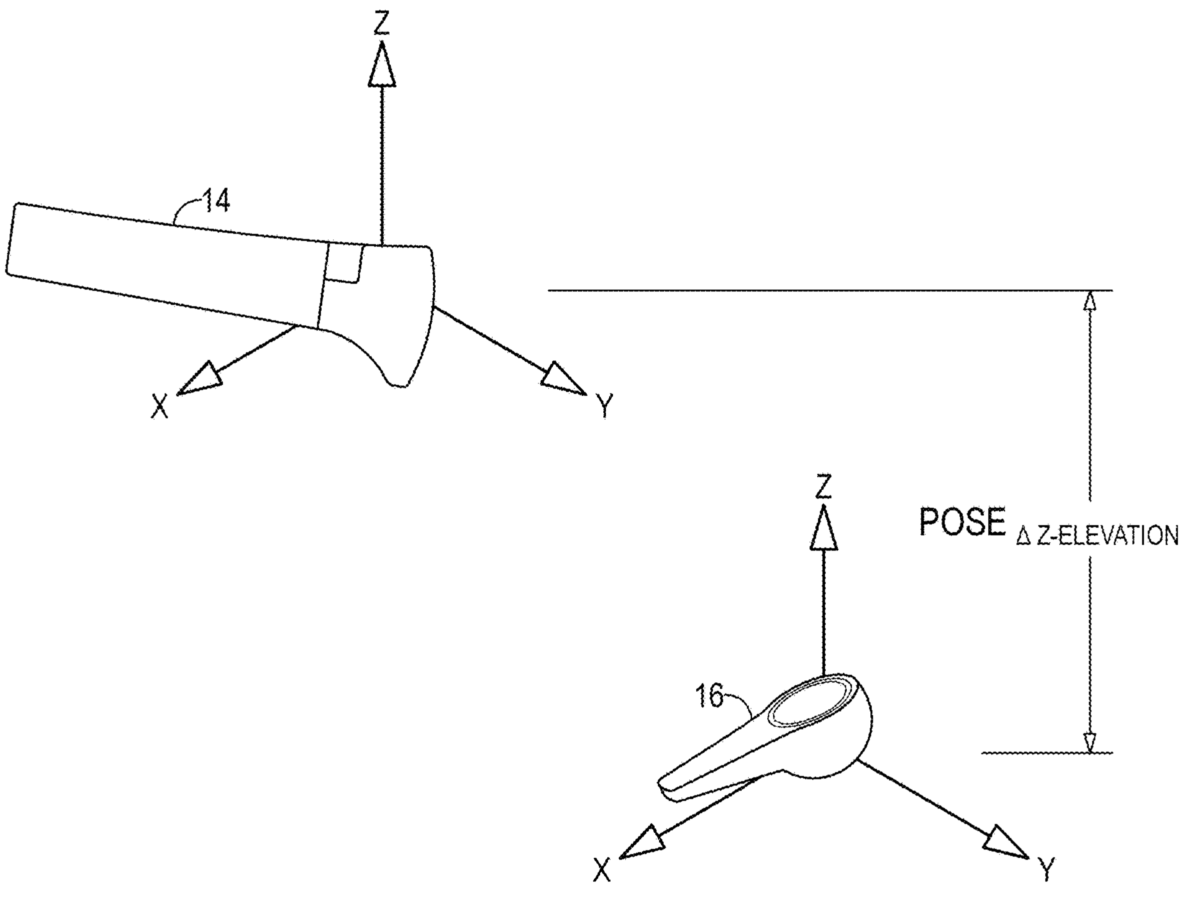
FIG. 9A is a plan view of an initial pose elevation between the HMD and hand-held control of the XR system of FIG. 1.

At time t=0, prior to the ground truth sensor system 20 losing tracking of the hand-held control 16, an initial relative elevation ($Pose_{\Delta z\text{-}elevation}$) between the HMD 14 and the hand-held control 16 (shown in FIG. 9A) is determined in a conventional manner (i.e., the processor 24 uses the ground truth pose data output by the ground truth sensor system 20 to correct the noisy pose data output by the control IMU 26*b* and indicative of the absolute pose of the hand-held control 16). Furthermore, during time t=0, the processor 24 computes the relative elevation error of the HMD altimeter 22*a* and the control altimeter 22*b* based on the determined relative elevation between the HMD altimeter 22*a* and the control altimeter 22*b* derived from the altimeter data output by the HMD altimeter 22*a* and the control altimeter 22*b* and the determined relative ground truth elevation between the HMD 14 and hand-held control 16 derived from the ground truth pose data output by the ground truth sensor system 20, in the same manner described above with respect to FIG. 2.

The processor 24 saves the computed relative elevation error of the HMD altimeter 22*a* and the control altimeter 22*b* in memory, such that the processor 24 may subsequently use the computed relative elevation error of the HMD altimeter 22*a* and the control altimeter 22*b* to correct the relative elevation of the HMD altimeter 22*a* and the control altimeter 22*b* determined when the ground truth sensor system 20 loses tracking of the hand-held control 16, as will be discussed in further detail below. Alternatively, to conserve processing power, the processor 24 may compute the relative elevation error of the HMD altimeter 22*a* and the control altimeter 22*b* only when it is determined that the ground truth sensor system 20 has lost tracking of the hand-held control 16, in which case, the processor 24 need only save in memory at time t=0, the altimeter data indicative of the absolute elevation of the HMD altimeter 22*a*, the altimeter data indicative of the absolute elevation of the control altimeter 22*b*, the ground truth pose data indicative of the absolute ground truth elevation of the HMD 14, and the ground truth pose data indicative of the absolute ground truth elevation of the hand-held control 16.

Figure 9B:
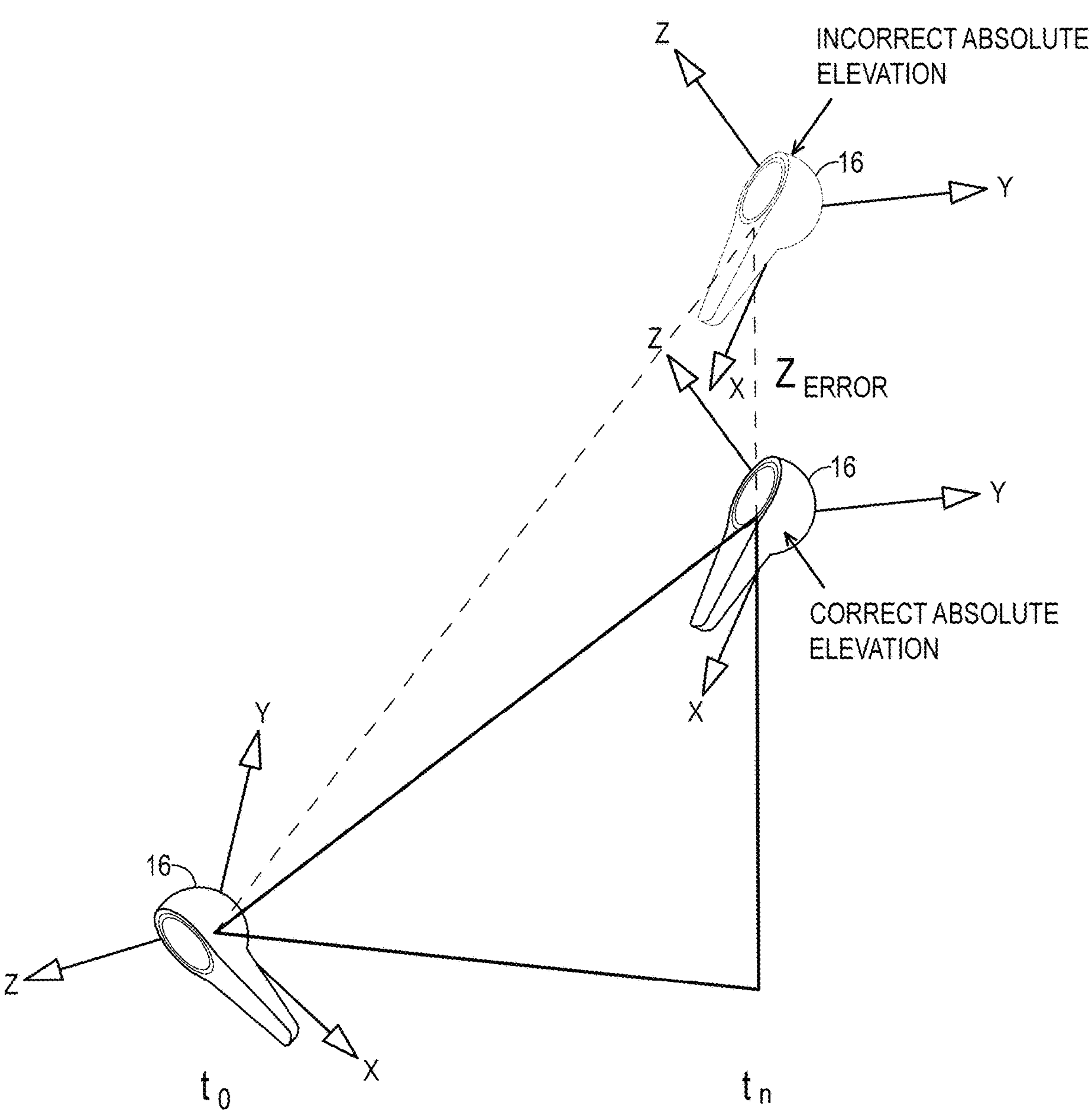
FIG. 9B is a plan view of an elevation correction of the hand-held control of the XR system of FIG. 1 in accordance with the technique illustrated in FIG. 9.

At t=n, the processor 24 determines whether the ground truth sensor system 20 has failed (e.g., if the ground truth sensor system 20 has lost tracking of the hand-held control 16), such that the ground truth sensor system 20 outputs noisy pose data having an elevation component that no longer accurately indicates the absolute elevation of the hand-held control 16 (150). For example, as illustrated in FIG. 9B, the noisy pose data has an elevation component that incorrectly indicates the absolute elevation of the hand-held control 16 with an error. The processor 24 may simply make this determination by determining that the ground truth sensor system 20 has lost tracking of the hand-held control 16, such that ground truth sensor system 20 is no longer accurately outputting corrective pose data having an elevation component that is indicative of the absolute elevation of the hand-held control 16.

If the ground truth sensor system 20 has not lost tracking of the hand-held control 16, the processor 24 uses the ground truth pose data output by the ground truth sensor system 20 to determine the absolute pose of the hand-held control 16 (152). If the ground truth sensor system 20 has lost tracking of the hand-held control 16, such that the ground truth pose data becomes noisy, the processor 24 uses the relative elevation between the HMD altimeter 22*a* and the control altimeter 22*b* (with the elevation error of the HMD altimeter 22*a* and the control altimeter 22*b* computed at time t=0 as compensation) to correct the elevation component of the noisy pose data.

In particular, at time t=n, the HMD altimeter 22*a* outputs atmospheric pressure data indicative of the absolute elevation of the HMD 14 (154*a*) and the control altimeter 22*b* outputs atmospheric pressure data indicative of the absolute elevation of the hand-held control 16 (154*b*). It should be appreciated that the VIO system associated with the HMD 14 is more robust than the VIO system associated with the hand-held control 16 (e.g., the VIO system associated with the HMD 14 has more cameras 28*b*). Thus, even though the ground truth sensor system 20 may lose tracking of the hand-held control 16 due to adverse lighting conditions or lack of tracking features in the environment, the ground truth sensor system 20 generally maintains tracking of the HMD 14. Thus, the processor 24 also updates the pose of the HMD 14 (156), such that the ground truth sensor system 20 outputs ground truth pose data comprising an elevation component indicative of the absolute ground truth elevation of the HMD 14 (158). This ground truth pose data is more accurate and represents the reference position of the system. The processor 24 also updates the pose of the hand-held control 16 (160), such that the ground truth sensor system 20, and in particular only the control IMU 26*b* of the ground truth sensor system 20, outputs noisy pose data having an elevation component indicative of the absolute ground truth elevation of the hand-held control 16 (162). The processor 24 then determines a relative elevation between the HMD altimeter 22*a* and the control altimeter 22*b* (166) based on (and in this embodiment, by applying a subtraction function 164 to) the atmospheric pressure data output by the HMD altimeter 22*a* (154*a*) and the atmospheric pressure data output by the control altimeter 22*b* (154*b*) in accordance with equation [1] above.

The processor 24 then determines the ground truth absolute elevation of the control altimeter 22*b* based on the ground truth pose data comprising an elevation component indicative of the absolute ground truth elevation of the HMD 14 (158), the relative elevation between the HMD altimeter 22*a* and the control altimeter 22*b* (166), and the relative elevation error 116 of the HMD altimeter 22*a* and control altimeter 22*b*.

In particular, the processor 24 determines an absolute elevation of the control altimeter 22*b* (170) based on (and in this embodiment, by applying a summation function 168 to) the ground truth pose data comprising an elevation component indicative of the absolute elevation of the HMD 14 (158) and the relative elevation between the HMD altimeter 22*a* and the control altimeter 22*b* (166) in accordance with the equation:

$$\text{Elevation}_{control} = \text{Elevation}_{HMD\text{-}truth} + \Delta\text{Elevation}_{control\text{-}HMD\text{-}alt}, \quad [8]$$

where $\text{Elevation}_{control}$ is the absolute elevation of the control altimeter 22*b*, $\text{Elevation}_{HMD\text{-}truth}$ is the ground truth absolute elevation of the HMD 14, and $\Delta\text{Elevation}_{control\text{-}HMD\text{-}alt}$ is the relative elevation between the HMD altimeter 22*a* and the control altimeter 22*b*.

The processor 24 then computes a corrected elevation of the HMD 14 (174) based on (and in this embodiment, by applying a summation function 172 to) the determined absolute elevation of the control altimeter 22*b* (170) and the relative elevation error of the HMD altimeter 22*a* and the control altimeter 22*b* (116) in accordance with the equation:

$$\Delta\text{Elevation}_{HMD\text{-}correct} = \text{Elevation}_{control} + \text{error}_{alt\text{-}control}, \quad [9]$$

where $\Delta\text{Elevation}_{HMD\text{-}correct}$ is the relative elevation between the HMD altimeter 22*a* and the control altimeter 22*b*, and $\text{Elevation}_{control}$ and $\text{error}_{alt\text{-}control}$ have been previously defined in equations [8] and [3] above.

The processor 24 then uses the corrected elevation of the HMD 14 (174) to correct the elevation component of the noisy pose data (162) output by the control IMU 26*b* (176), and outputs updated ground truth pose data indicating the correct absolute elevation of the hand-held control 16. The process then repeats for time t=n+1.

Figure 10A:
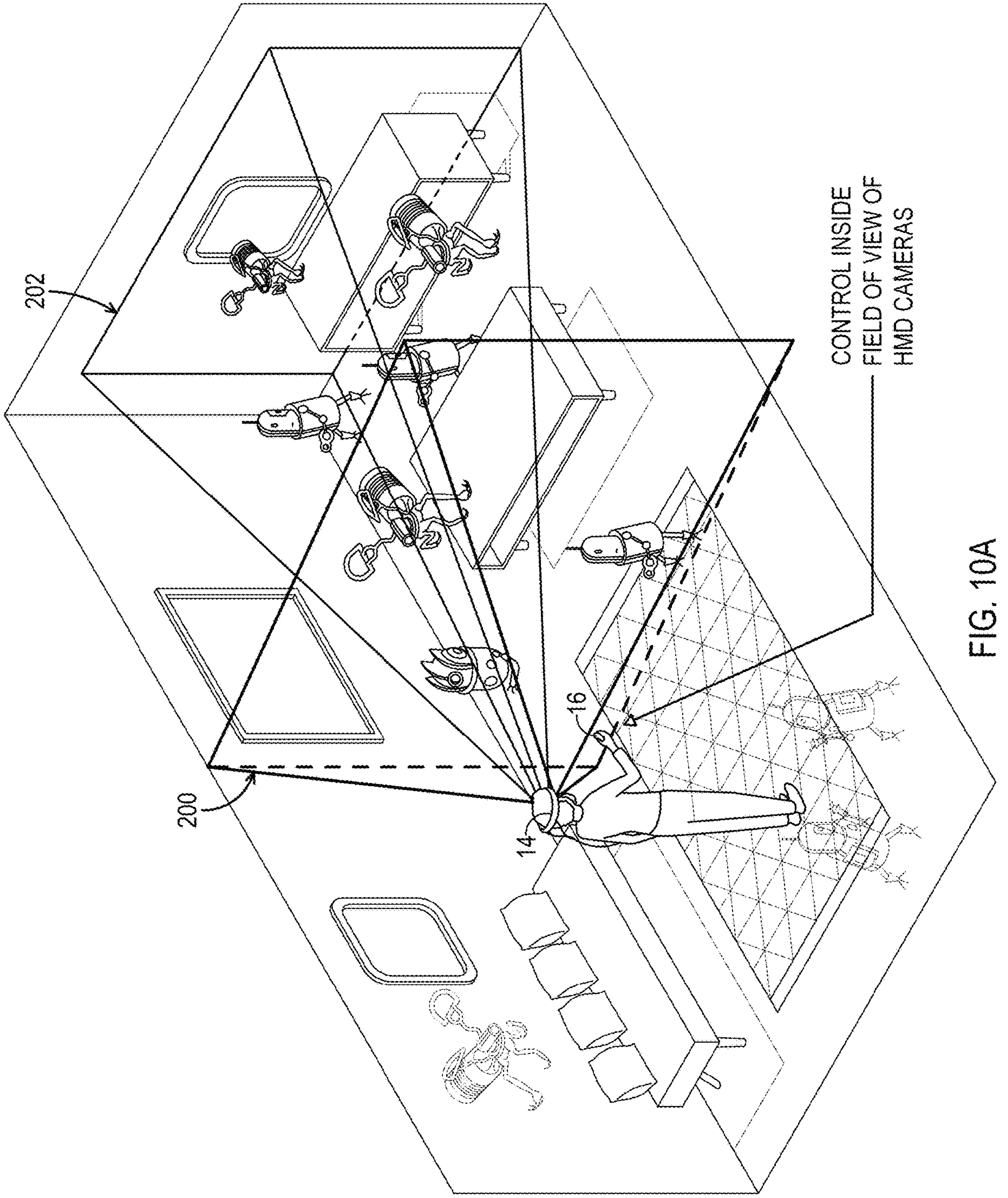
FIG. 10A is a pictorial illustrating a user wearing the XR system of FIG. 1, while holding the hand-held control within a field of view of cameras carried by the HMD.
Figure 10B:
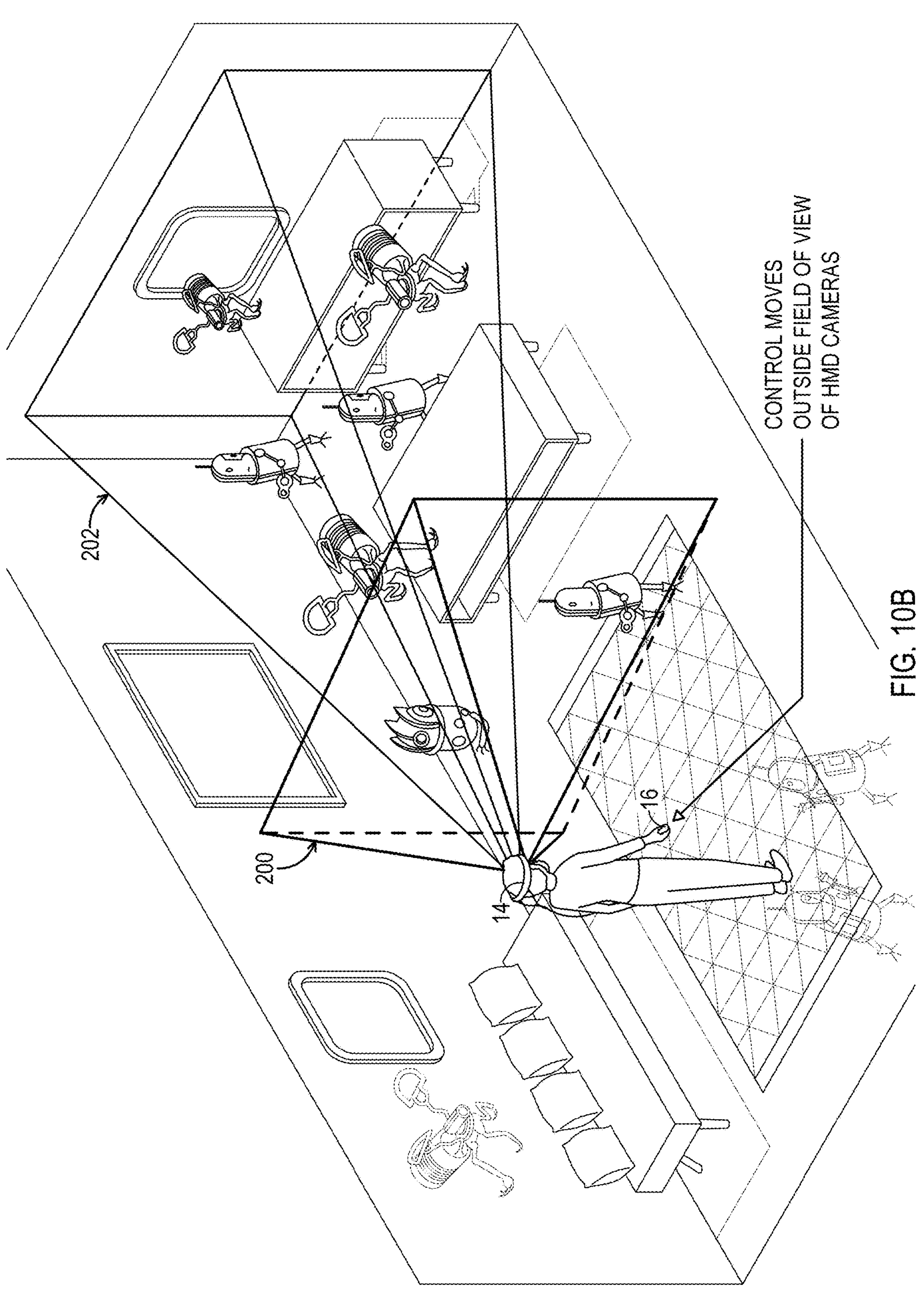
FIG. 10B is a pictorial illustrating a user wearing the XR system of FIG. 1, while holding the hand-held control outside of the field of view of the cameras carried by the HMD.
Figure 10C:
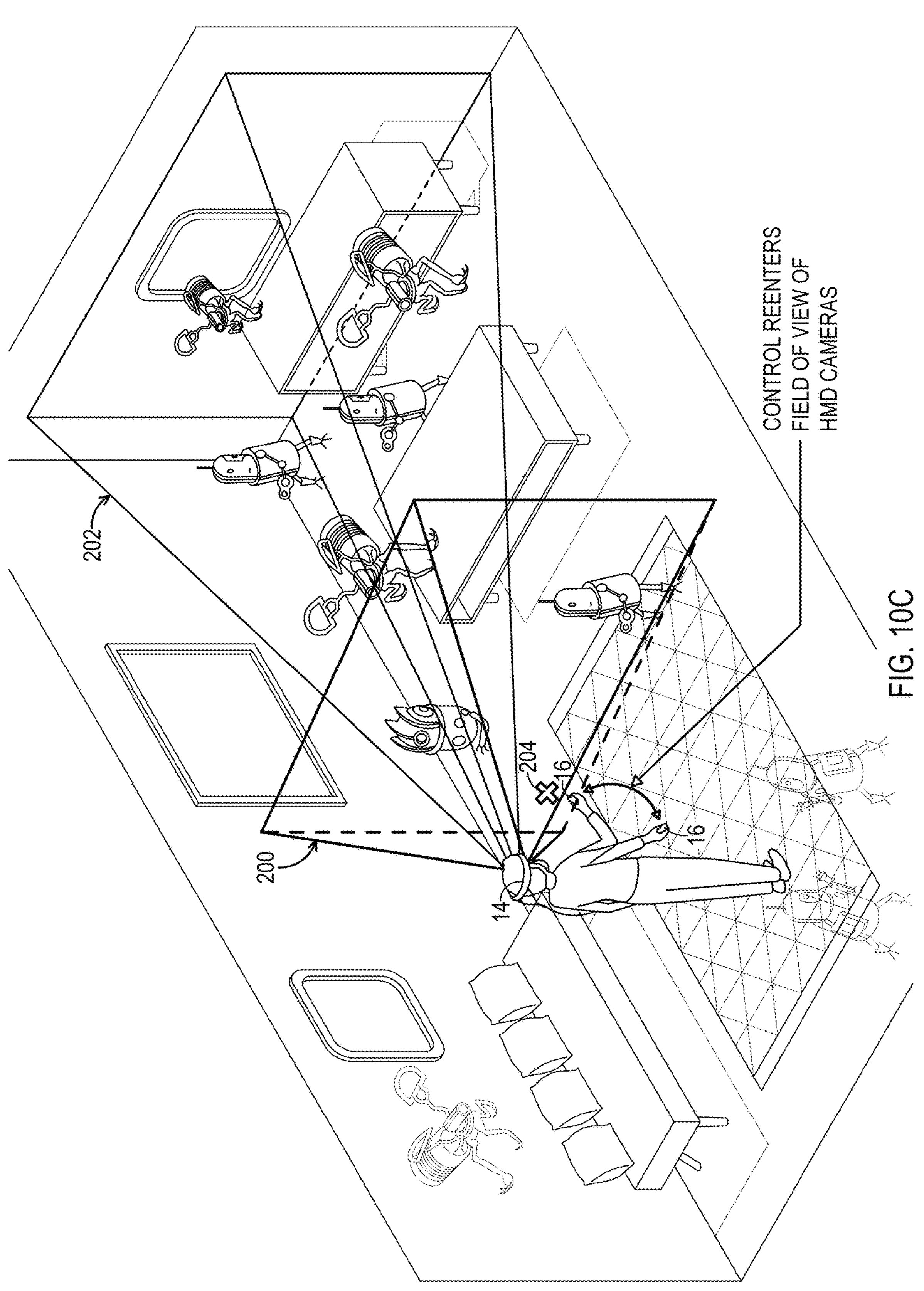
FIG. 10C is a pictorial illustrating a user wearing the XR system of FIG. 1, while moving the hand-held control from outside of the field of view to inside of the field of view of the cameras carried by the HMD.

With reference now to FIGS. 10A-10C, one technique using the relative elevation between the HMD 14 and the hand-held control 16 derived from the atmospheric pressure data output by the HMD altimeter 22*a* and the control altimeter 22*b* to continue to locate the hand-held control 16 relative to the HMD 14 when the hand-held control 16 (and the associated LED array 30) is moved outside the field of view of the HMD cameras 28*a*, will be described.

As illustrated in FIG. 10A, in order for the ground truth sensor system 20 to keep track of the hand-held control 16 relative to the HMD 14, the hand-held control 16 must be located within the field of view 200 of the cameras (not shown) located on the HMD 14, such that the LED array 30 (not shown in FIG. 10A) carried by the hand-held control 16 is visible to the HMD cameras 28*a* (not shown in FIG. 10A) carried by the HMD 14. The field of view 200 of the cameras 28*a* is wider than the field of view 202 of the user 12, such that objects, such as the hand-held control 16 can be tracked by the ground truth sensor system 20 even when such objects are outside of the field of view 202 of the user 12.

As illustrated in FIG. 10B, when the hand-held control 16 is moved outside the field of view 200 of the HMD cameras 28*a* (not shown in FIG. 10B) carried by the HMD 14, such that LED array 30 (not shown in FIG. 10B) carried by the hand-held control 16 is no longer visible to the HMD cameras 28*a*, the ground truth sensor system 20 loses tracking of the hand-held control 16, and therefore, no longer knows exactly where in space the hand-held control 16 is located relative to the HMD 14, or the relative location between the HMD 14 and the hand-held control 16 has a significant error. However, the relative elevation between the HMD 14 and the hand-held control 16 derived from the atmospheric pressure data output by the HMD altimeter 22*a* and the control altimeter 22*b* may be used to locate the hand-held control 16 relative to the HMD 14 when the hand-held control 16 is outside of the field of view 200 of the HMD cameras 28*a*.

As illustrated in FIG. 10C, with knowledge of the relative elevation between the HMD 14 and the hand-held control 16, the processor 24 may better predict where in space the hand-held control 16 will reappear (the reentry position 204) within the field of view 200 of the HMD cameras 28*a* (not shown in FIG. 10C) carried by the HMD 14. As a result, the ground truth sensor system 20 need not have to look for the LED array 30 throughout the entire field of view 200 of the HMD cameras 28*a*, but rather can focus on a certain portion of the field of view 200 (e.g., the upper portion of the field of view 200 or the lower portion of the field of view 200) in anticipation of the reappearance of the LED array 30 within the field of view 200. As a result, savings in the compute resources of the XR system 10, as well as quicker and smoother transition of the hand-held control 16 within the projected world, may be realized.

What is claimed:

1. An extended reality (XR) system, comprising:

a head-mounted display (HMD) configured for displaying virtual content to a user;

a first altimeter carried by the HMD, the first altimeter configured for outputting first atmospheric pressure data indicative of an elevation of the HMD;

a hand-held control;

a second altimeter carried by the hand-held control, the second altimeter configured for outputting second atmospheric pressure data indicative of an elevation of the hand-held control; and at least one processor configured for determining a relative elevation between the first altimeter and the second altimeter based on the first atmospheric pressure data and the second atmospheric pressure data, wherein the virtual content has a user-interactable object, and the least one processor is configured for allowing the user to interact with the user-interactable object of the displayed virtual content based on the determined relative elevation between the first altimeter and the second altimeter.

2. An extended reality (XR) system, comprising:

a head-mounted display (HMD) configured for displaying virtual content to a user;

a first altimeter carried by the HMD, the first altimeter configured for outputting first atmospheric pressure data indicative of an elevation of the HMD;

a hand-held control;

a second altimeter carried by the hand-held control, the second altimeter configured for outputting second atmospheric pressure data indicative of an elevation of the hand-held control;

at least one processor configured for determining a relative elevation between the first altimeter and the second altimeter based on the first atmospheric pressure data and the second atmospheric pressure data; and a ground truth sensor system configured for outputting pose data comprising elevation components respectively indicative of an absolute ground truth elevation of the HMD and an absolute ground truth elevation of the hand-held control, wherein the at least one processor is configured for determining a relative ground truth elevation between the HMD and the hand-held control based on the absolute ground truth elevation of the HMD and an absolute ground truth elevation of the hand-held control, and computing a relative elevation error of the determined relative elevation between the first altimeter and the second altimeter based on the determined relative ground truth elevation between the HMD and the hand-held control and the determined relative elevation between the first altimeter and the second altimeter.

3. The XR system of claim 2, wherein the ground truth sensor system comprises a plurality of different sensors respectively configured for outputting different types of pose data having a plurality of elevation components, and wherein the at least one processor is configured for fusing the different types of pose data to generate the ground truth pose data comprising the elevation components respectively indicative of the absolute ground truth elevation of the HMD and the absolute ground truth elevation of the hand-held control.

4. The XR system of claim 3, wherein the ground truth sensor system comprises:

visual inertial odometry (VIO) system having at least one camera located on the HMD and at least one camera located on the hand-held control.

5. The XR system of claim 4, wherein the ground truth sensor system further comprises a light emitting diode (LED) array tracking system having an LED array located on the hand-held control.

6. An extended reality (XR) system, comprising:

a head-mounted display (HMD) configured for displaying virtual content to a user;

a first altimeter carried by the HMD, the first altimeter configured for outputting first atmospheric pressure data indicative of an elevation of the HMD;

a hand-held control;

a second altimeter carried by the hand-held control, the second altimeter configured for outputting second atmospheric pressure data indicative of an elevation of the hand-held control;

at least one processor configured for determining a relative elevation between the first altimeter and the second altimeter based on the first atmospheric pressure data and the second atmospheric pressure data;

a user-wearable compute pack configured for processing, cashing, and/or storing data, wherein the HMD is configured for using the data to display the virtual content to a user; and a third altimeter carried by the user-wearable compute pack, the third altimeter configured for outputting third atmospheric pressure data indicative of an elevation of the compute pack;

wherein the at least one processor is further configured for determining a relative elevation between the first altimeter and the third altimeter based on the first atmospheric pressure data and the third atmospheric pressure data.

7. The XR system of claim 6, wherein the processor is further configured for inferring a relative elevation between a head of the user and a hand of the user from the determined relative elevation between the first altimeter and the second altimeter, and inferring a relative elevation between a head of the user and a body part of the user remote from the head from the determined relative elevation between the first altimeter and the third altimeter.

8. The XR system of claim 7, wherein the user-wearable compute pack is configured for being worn on a hip of the user, and the body part of the user is the hip.

9. The XR system of claim 7, wherein the at least one processor is configured for tracking a physical activity performed by the user based on the one or both of the determined relative elevation between the first altimeter and the second altimeter and the determined relative elevation between the first altimeter and the third altimeter.

10. The XR system of claim 9, wherein the at least one processor is configured for rating the physical activity performed by the user.

11. The XR system of claim 1, further comprising a ground truth sensor system configured for outputting pose data comprising elevation components respectively indicative of an absolute ground truth elevation of the HMD and an absolute ground truth elevation of the hand-held control, wherein the at least one processor is configured for determining a relative ground truth elevation between the HMD and the hand-held control based on the absolute ground truth elevation of the HMD and an absolute ground truth elevation of the hand-held control, computing a relative elevation error of the determined relative elevation between the first altimeter and the second altimeter based on the determined relative ground truth elevation between the HMD and the hand-held control and the determined relative elevation between the first altimeter and the second altimeter, and computing a relative elevation error of the determined relative elevation between the first altimeter and the third altimeter based on the determining relative elevation between the first altimeter and the second altimeter, the computed relative elevation error of the determined relative elevation between the first altimeter and the second altimeter, and the determined relative elevation between the first altimeter and the third altimeter.

12. An extended reality (XR) system, comprising:

a head-mounted display (HMD) configured for displaying virtual content to a user;

a first altimeter carried by the HMD, the first altimeter configured for outputting first atmospheric pressure data indicative of an elevation of the HMD;

a hand-held control;

a second altimeter carried by the hand-held control, the second altimeter configured for outputting second atmospheric pressure data indicative of an elevation of the hand-held control;

at least one processor configured for determining a relative elevation between the first altimeter and the second altimeter based on the first atmospheric pressure data and the second atmospheric pressure data; and a noisy sensor having a pose estimation drift and carried by the hand-held control, the noisy sensor configured for outputting noisy pose data having an elevation component indicative of an absolute elevation of the hand-held control, wherein the at least one processor is configured for correcting the elevation component of the noisy pose data based on the determined relative elevation between the first altimeter and the second altimeter.

13. The XR system of claim 12, wherein the noisy sensor is an Inertial Measurement Unit (IMU).

14. The XR system of claim 1, further comprising a ground truth sensor system configured for outputting ground truth pose data having an elevation component indicative of an absolute elevation of the hand-held control, wherein the at least one processor is configured for determining if the ground truth sensor system has failed, such that the ground truth sensor assembly outputs noisy poise data having an elevation component that does not accurately indicate the absolute elevation of the hand-held control, and correcting the elevation component of the noisy pose data based on the determined relative elevation between the first altimeter and the second altimeter if the ground truth sensor system is determined to have failed.

15. The XR system of claim 14, wherein the ground truth sensor system comprises a noisy sensor having a pose estimation drift and carried by the hand-held control, and one or more noise correction sensors configured for outputting corrective pose data having an elevation component indicative of a ground truth absolute elevation of the hand-held control, wherein the at least one processor is configured for periodically correcting the pose estimation drift of the noisy sensor based on the ground truth absolute elevation of the hand-held control.

16. The XR system of claim 15, wherein the noisy sensor is an Inertial Measurement Unit (IMU).

17. The XR system of claim 15, wherein the noisy sensor is configured for outputting the noisy pose data at a first frequency, and the one or more noise correction sensors are configured for outputting the corrective pose data at a second frequency less than the first frequency.

18. The XR system of claim 15, wherein the at least one processor is configured for determining that the ground truth sensor system has failed by determining that the ground truth sensor system is no longer accurately outputting corrective pose data having an elevation component indicative of the absolute elevation of the hand-held control.

19. The XR system of claim 14, wherein the ground truth sensor system is further configured for outputting ground truth pose data having an elevation component indicative of an absolute elevation of the HMD, and wherein the at least one processor is configured for correcting the elevation component of the ground truth pose data further based on the determined relative elevation between the first altimeter and the second altimeter ground truth pose data having the elevation component indicative of the absolute elevation of the HMD, and wherein the at least one processor is configured for correcting the elevation component of the noisy pose data further based on a known relative elevation error of the determined relative elevation between the first altimeter and the second altimeter.

* * * * *